US011347864B2

United States Patent
Quiros Araya et al.

(10) Patent No.: US 11,347,864 B2
(45) Date of Patent: May 31, 2022

(54) ACE: ASSURANCE, COMPOSED AND EXPLAINED

(71) Applicant: Siemens Aktiengesellschaft, Munich (DE)

(72) Inventors: Gustavo Arturo Quiros Araya, Princeton, NJ (US); Arquimedes Martinez Canedo, Plainsboro, NJ (US); Sanjeev Srivastava, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 602 days.

(21) Appl. No.: 16/285,351

(22) Filed: Feb. 26, 2019

(65) Prior Publication Data

US 2019/0266332 A1 Aug. 29, 2019

Related U.S. Application Data

(60) Provisional application No. 62/635,797, filed on Feb. 27, 2018.

(51) Int. Cl.
*G06F 9/44* (2018.01)
*G06F 21/57* (2013.01)
*G06F 11/36* (2006.01)
*G06F 11/32* (2006.01)
(Continued)

(52) U.S. Cl.
CPC .......... *G06F 21/577* (2013.01); *G06F 11/008* (2013.01); *G06F 11/079* (2013.01); *G06F 11/32* (2013.01); *G06F 11/3612* (2013.01); *G06F 2221/033* (2013.01)

(58) Field of Classification Search
CPC .... G06F 21/577; G06F 11/008; G06F 11/079; G06F 11/32; G06F 11/3612; G06F 2221/033
See application file for complete search history.

(56) References Cited

U.S. PATENT DOCUMENTS 8,065,658 B1 * 11/2011 Bali .......................... G06F 8/70
717/113
9,454,465 B1 * 9/2016 Jhoney ................ G06F 11/3668
(Continued)

OTHER PUBLICATIONS

Whalen M, Gacek A, Cofer D, Murugesan A, Heimdahl MPE, Rayadurgam S. Your what is my how: iteration and hierarchy in system design. IEEE Software 30, 54 60. 2013 (doi:10.1109/MS).
(Continued)

*Primary Examiner* — Hang Pan (57) ABSTRACT

A computer-implemented method for quantifying assurance of a software system includes collecting artifacts of the software system generated during phases of the software system's engineering lifecycle. A graph of graphs (GoG) is constructed encoding the artifacts. Each subgraph in the GoG is a semantic network corresponding to a distinct assurance requirement. The GoG is used to calculate a component assurance value for each software component for each distinct assurance requirement. A system assurance value is calculated based on the component assurance values. An architectural view of the software system is presented showing at least one of the component assurance values and the system assurance values.

20 Claims, 5 Drawing Sheets

(51) Int. Cl.
    *G06F 11/07*    (2006.01)
    *G06F 11/00*    (2006.01)

(56)           References Cited

U.S. PATENT DOCUMENTS

| | | | | |
|---|---|---|---|---|
| 2006/0242711 | A1* | 10/2006 | Anzai | G06F 21/577 |
| | | | | 726/25 |
| 2009/0013283 | A1* | 1/2009 | Mosterman | G06F 8/10 |
| | | | | 715/808 |
| 2009/0222239 | A1* | 9/2009 | Ehlers | G05B 23/0251 |
| | | | | 702/182 |
| 2010/0122238 | A1* | 5/2010 | Kannan | G06F 8/36 |
| | | | | 717/123 |

OTHER PUBLICATIONS

Rockwell Collins. Secure Mathematically-Assured Composition of Control Models. Final Technical Report, Sep. 2017. AFRL-RI-RS-TR-2017-176.

* cited by examiner

Fig. 1

| Stage | Example Artifacts |
|---|---|
| Requirements | Requirements documents, Design documents |
| Development | UML Diagrams (e.g., Use Case Diagrams, Sequence Diagrams, etc.) |
| Debugging | Debugging logs, stack traces |
| Formal Verification | Contracts (pre-conditions, post-conditions, class invariants, loop invariants, etc.), data from model checkers, or SAT/SMT solvers |
| Testing | Test strategy documents, test plan documents, bug reports, traceability matrices |
| Integration | Connectivity, mappings, security settings |
| Deployment | Executables, compiler logs, directory listings |
| Operation | Error logs, stack traces, exception handling logs, runtime data from sensors, runtime data from control systems |

ACE: ASSURANCE, COMPOSED AND EXPLAINED

CROSS REFERENCE TO RELATED APPLICATIONS

This application claims the benefit of U.S. Provisional Application Ser. No. 62/635,797 filed Feb. 27, 2018, which is incorporated herein by reference in its entirety

TECHNICAL FIELD

The present disclosure relates generally to a graph-based way of quantifying the assurance of a system in a hierarchical manner. The various systems, methods, and apparatuses described herein may be applied to, for example, expose the assurance and risk of safety-critical systems across all their components using information from multiple sources of evidence: formal verification, testing, simulation and operation.

BACKGROUND

The term "system assurance" refers to "[t]he justified confidence that the system functions as intended and is free of exploitable vulnerabilities, either intentionally or unintentionally designed or inserted as part of the system at any time during the life cycle." See NISTIR 8179 Criticality Analysis Process Model| CSRC, https://csrc.nist.gov/glossary/term/System-Assurance (last visited Feb. 8, 2019).

The state-of-the-art in systems assurance is based on testing, simulation and certification, and it is currently incorporating formal verification for some of the system's components. The size and complexity of the system has led to the development of component-based assurance. The conventional approach to system assurance defines contracts for system components expressing the assumptions (preconditions) and guarantees (post-conditions) of the components' operation and verifies a components implementation against its contract using a formal model of the component's behavior. The system can then be formally verified from the composition structure and contracts of its direct subcomponents, without the need of in-depth complete system verification.

Formal verification has a very limited use at present because it calls for a clean slate design and development, which are not always possible or practical, and because it is computationally impractical for large systems. Therefore, formal verification is commonly constrained to single software or hardware components. Testing and simulation are employed to evaluate system behaviors in their environments with a possibly large coverage. However, the selection of testing and simulation conditions is manual and prone to human bias of what "worst conditions" mean for the system. Runtime data from the real operation is used for post-mortem diagnostics of specific problems, but not for evaluating the assurance of the system. The embedment of the system in an environment can cause problems that were not considered in the design and development phases.

SUMMARY

Embodiments of the present invention address and overcome one or more of the above shortcomings and drawbacks, by providing methods, systems, and apparatuses related to determining determine the assurance and the risk of hierarchical safety-critical systems during their entire life-cycle and in real-situation conditions. Briefly, the techniques described herein employ a system referred to herein as Assurance, Composed and Explained or "ACE." ACE is a new principled approach to quantify and expose the assurance and risk of safety-critical systems across all their components using information from multiple sources of evidence: formal verification, testing, simulation and operation. ACE combines logic-based and data-driven techniques for probabilistic assurance and risk evaluation of system components with or without formally verifiable models while considering multiple assurance aspects. ACE extends the contracts of system components with "emergent assumptions" that are discovered during simulation, testing and operation, in an effort to make all of the implementation's assumptions explicit. In some embodiments, ACE provides an "assurance heat map" that can guide design and implementation improvement, support the isolation and solution of errors, and assist in strategic decisions.

According to some embodiments, a computer-implemented method for quantifying assurance of a software system includes collecting artifacts of the software system generated during phases of the software system's engineering lifecycle. A graph of graphs (GoG) is constructed encoding the artifacts. Each subgraph in the GoG is a semantic network corresponding to a distinct assurance requirement. The GoG is used to calculate a component assurance value for each software component for each distinct assurance requirement. A system assurance value is calculated based on the component assurance values. An architectural view of the software system is presented showing at least one of the component assurance values and the system assurance values.

In some embodiments, an article of manufacture for quantifying assurance of a software system comprises a non-transitory, tangible computer-readable medium holding computer-executable instructions for performing the method discussed above.

According to other embodiments, a system for quantifying assurance of a software system includes a database and a computer. The database stores a GoG encoding (a) a list of contracts associated with the software system providing assumptions and guarantees for execution of each software component and (b) one or more artifacts of the software system generated during one or more phases of the software system's engineering lifecycle. The computer uses the GoG to calculate a component assurance value for each software component for each distinct assurance requirement. A system assurance value is calculated by the computer based on the component assurance values. The computer may then present an architectural view of the software system depicting at least one of the component assurance values and the system assurance values.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to a framework for system assurance processing referred to herein as Assurance, Composed and Explained or "ACE." ACE determines the assurance and the risk of hierarchical safety-critical systems during their entire life-cycle and in real-situation conditions. Such safety-critical systems generally are large and complex systems that require composition of assurance and risk metrics; are composed by both legacy and formally verified components; contain incomplete or missing formal models and verification results of some components; are provided with assurance of some component contracts, but cannot be fully trusted; and suffer from emergence of assurance issues and risks due to system integration. ACE may be employed to quantify and expose the assurance of safety-critical systems across all their components while considering multiple aspects of the system that need to be assured. ACE provides a framework for probabilistic assurance and risk evaluation of hierarchical systems that utilizes information from multiple sources of evidence: formal verification, testing, simulation and operation. Although the ACE framework is suitable for whole-system assurance and risk evaluation, the discussion that follows uses software components of the safety-critical system as an example.

Figure 1:
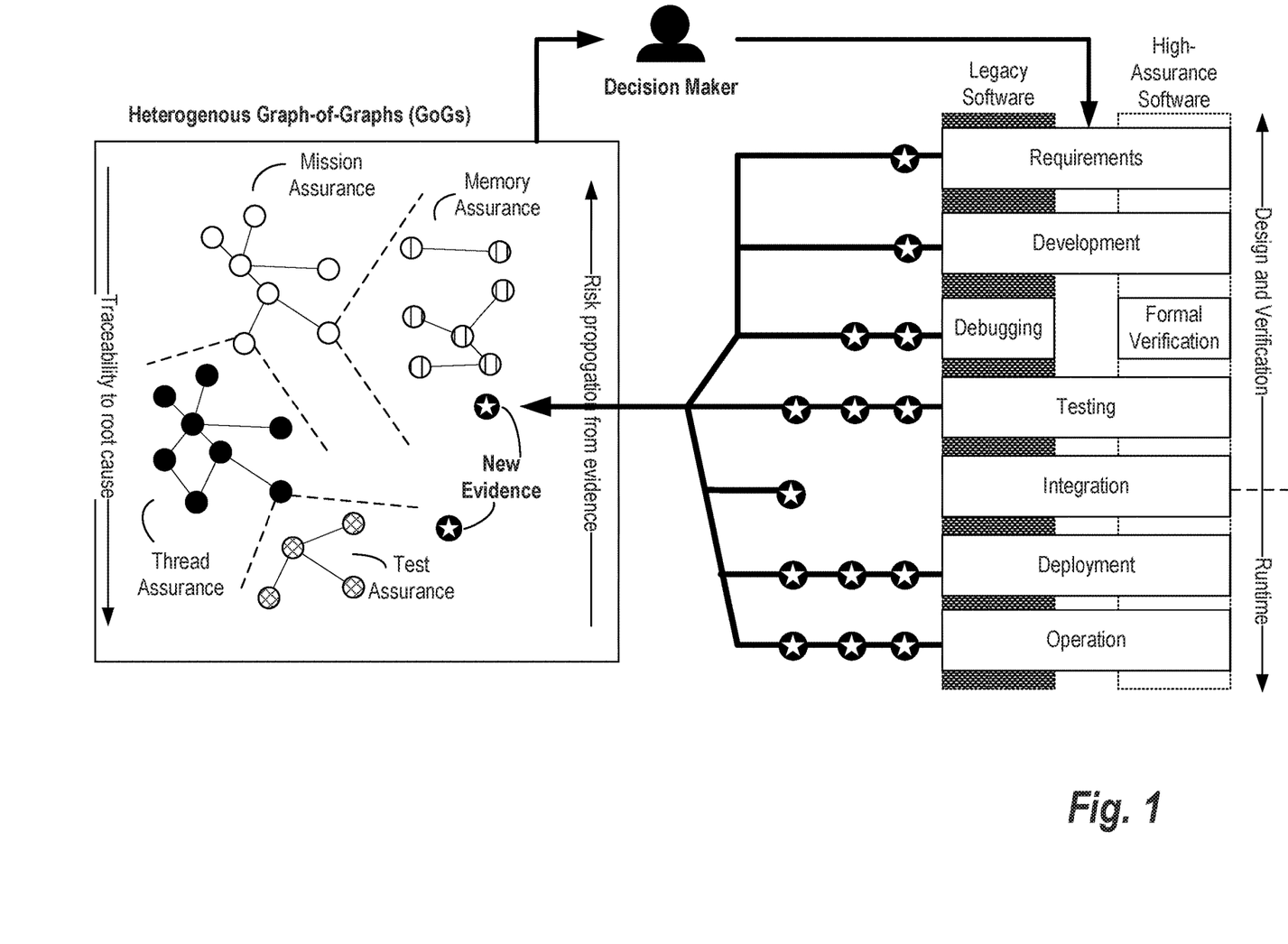
FIG. 1 illustrates an overview of ACE, according to some embodiments.

FIG. 1 illustrates an overview of ACE, according to some embodiments. In this example, a plurality of artifacts from the entire engineering lifecycle are integrated into a heterogeneous graph-of-graphs (GoG) that represents the distinct aspects of the system that need to be assured as separate subgraphs. As is understood in the art, a graph is an object that comprises one or more nodes (also called vertices) and edges (also called arcs) that represent connections between pairs of nodes. A GoG is a graph structure where the nodes of the structure are graphs. The individual nodes of the GoG are each connected by edges that correspond between relationships between the constituent graphs.

Figure 2:
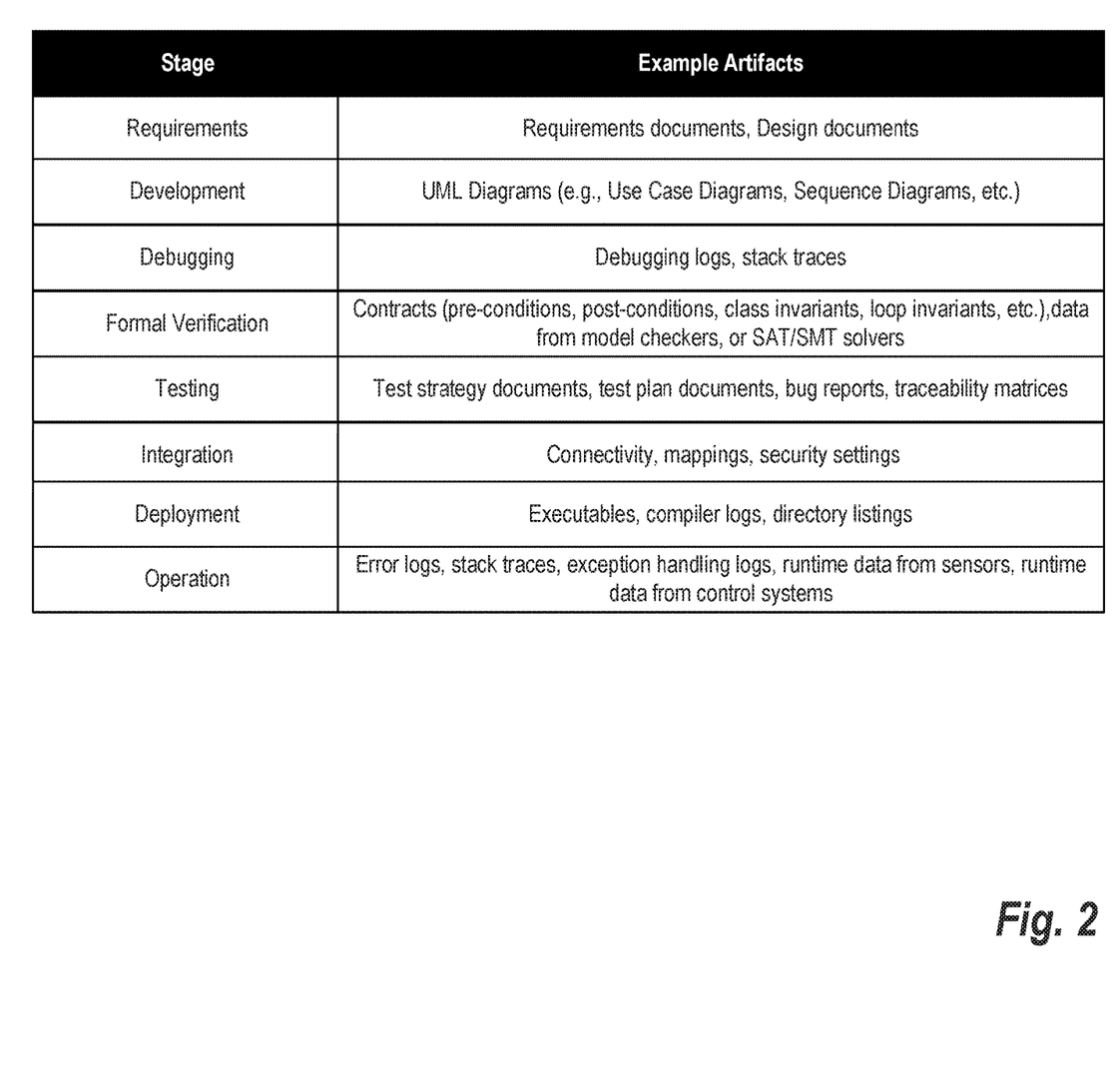
FIG. 2 provides a list of example artifacts that may be used with various embodiments of the present invention.

The techniques described herein generate the graph based on artifacts gathered during the lifecycle of the system being analyzed. These artifacts (shown as stars in FIG. 1) can be extracted from the various tools and hardware using parsers, database clients, plug-ins in engineering tools, data acquisition interfaces, etc. FIG. 2 provides a list of example artifacts that may be used with various embodiments of the present invention. Because the lifecycle of the system is ongoing, the GoG is continuously evolving, as new information comes in. As updates occur, the assurance and risk quantities may be recomputed in order to provide a continuous risk assessment capability for the decision makers. Additionally, the effects on the system may be fed back to the GoG as the corresponding artifacts are modified.

Thanks to the access to heterogeneous linked artifacts stored in the GoG, the GoG can be used for various assurance aspects, e.g., operational safety, security vulnerabilities, I/O, errors and exceptions, timing, concurrency/threading/synchronization, failures due to physical environment conditions, or failures due to human intervention. For example, in one embodiment, the GoG may be used to compute one or more of the following metrics per system component and connection: assurance as the estimated degree of correctness, safety and security; and risk as the calculated probability of system's vulnerability towards a failure or a security breach. These component-level metrics are hierarchically composed to determine the whole-system metrics. The functional decomposition of the system is used to refine the metric composition and weigh the impact of the individual metrics on the system and its mission.

Due to the great heterogeneity of the available information about components and the complexity of the composed systems, we employ evidence theory or Dempster-Shafer theory for reasoning with uncertainty, allowing us to assess assurance and risk in the case of incomplete information. Our approach combines evidence from different sources and reaches a degree of belief for the calculated metrics by considering all the available evidence: component contracts and certifications, formal verification results, testing results, simulation results and real operation data.

As noted above, conventional software contracts provide assumptions and guarantees on a per-component basis. With the techniques described herein, the contracts of system components are extended with "emergent assumptions" that are discovered during simulation, testing and operation, in an effort to make all of the implementation's assumptions explicit. Whenever a system change is made, a previously identified emergent assumption might indicate the risk of a problem before the system is tested. We will use statistical data analysis techniques to discover the emergent assumptions. For instance, the use of a particular threading library within the tested environments of a component can indicate a hidden assumption about the library's use in the component's implementation. Capturing this emergent assumption can raise the suspicion that replacing the threading library might cause problems with the component.

ACE's mathematical framework will be used throughout the system's lifecycle to maintain an updated overview of the system's assurance and risk assessment: at development time, by merging results from component verification (e.g., from model checkers or propositional satisfiability (SAT)/Satisfiability Modulo Theories (SMT) solvers); during testing and simulation, by merging results from test and simulation runs; and during operation, by merging runtime data acquired from system sensors and control systems. This continuous evaluation provides an "assurance heat map" of the system where "risk hotspots" are identified and can be used to concentrate verification and validation efforts. In this way, ACE may be used to close the loop between runtime and design to better assess the cost/risk trade-off of system assurance.

Figure 3:
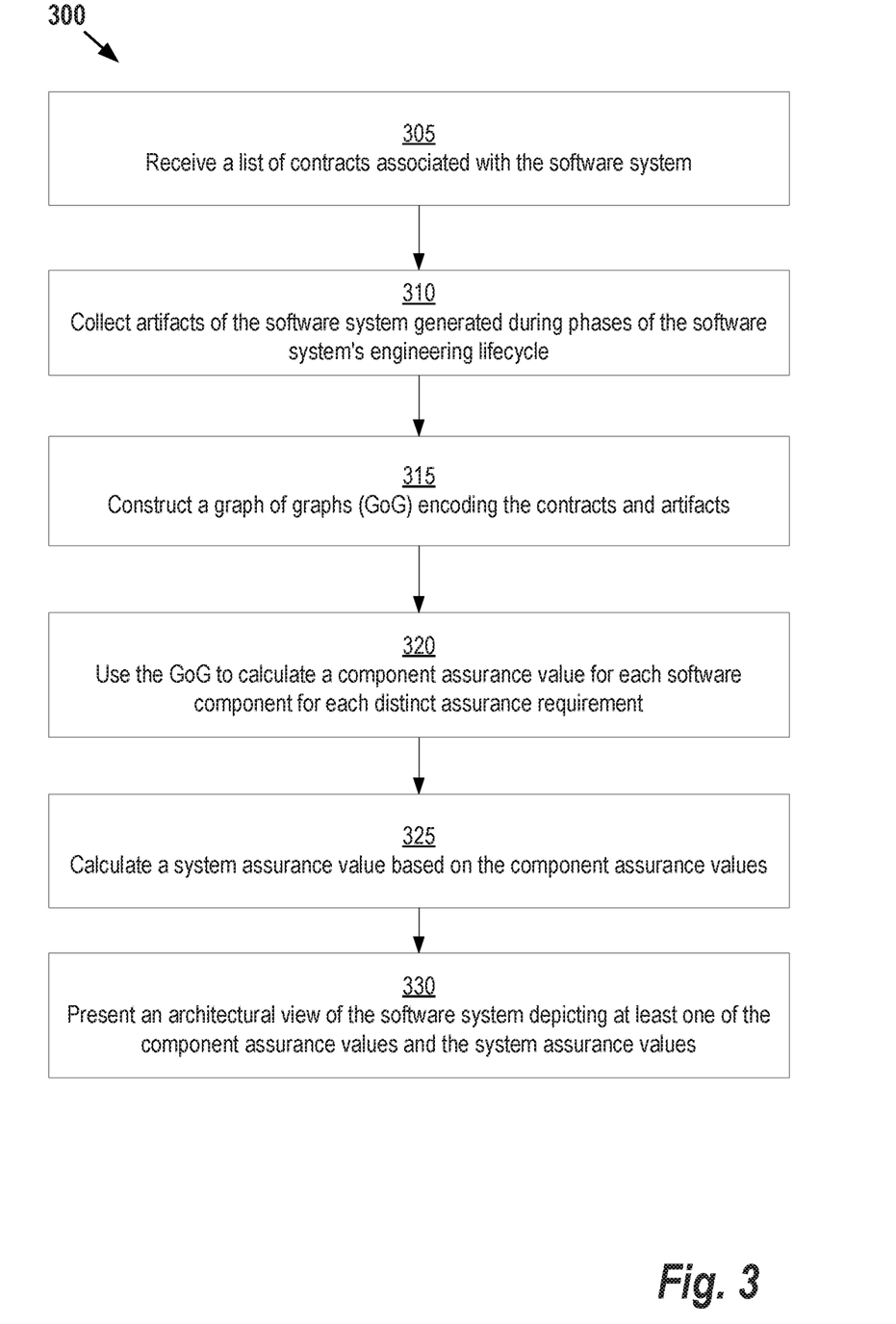
FIG. 3 illustrates an example, computer-implemented method for quantifying assurance of a software system according to some embodiments.

FIG. 3 illustrates an example, computer-implemented method 300 for quantifying assurance of a software system according to some embodiments. This method may be performed, for example, by a computer connected to the computer system where development is performed, the computer system where the software is deployed, or a dedicated quality assurance computer system.

Starting at step 305, the computing system receives a list of contracts associated with the software system. Each of the software components is associated with a contract providing assumptions and guarantees for execution of the software component. This step is optional; for example, in some embodiments, the assumptions and guarantees may be all derived dynamically as described in the steps that follow without having any "baseline" assumptions/guarantees. At step 310, the computing system collects one or more artifacts of the software system generated during one or more phases of the software system's engineering lifecycle. These artifacts are used to generate "emergent assumptions" that extend the contracts received at step 305. These artifacts may be collected from sources such as requirement documents, interface and implementation data, formal verification results, certification data, test data, simulation data, etc. The sources can be both internal and external to the computing system implementing the method 200. For example, in some embodiments, the computing system interfaces with a document storage system to retrieve requirements documents, documents with test data, product specifications, etc. Once a document is generated, the computing system may employ document processing software to extract key features of interest. In situations where the document follows a standard format, simple rules-based system may be used to identify keywords and extract relevant information. In more complex scenarios a machine learning approach may be employed.

The documents containing the contracts and artifacts can include structured and unstructured data. In the case of structured data, where the structure is known, the computing system can directly extract the relevant information. Where unstructured data is collected, the computing systems may be analyzed in order to identify relevant data items. In general, any technique known in the art may be employed to perform extraction of unstructured text content. For example, in one embodiment a natural language understanding module such as IBM's Watson Natural Language Understanding (NLU) or the Python Natural Language Toolkit (NLTK) may be employed. Each type of data source can have a separate module for its particular data type (e.g., a requirements document processing module, a simulation data processing module, etc.). Alternatively, a single natural language understanding module can be employed with different configuration files used to specify keywords and other information needed for extracting the unstructured content.

At step 315, the computing system constructs a GoG that encodes the contracts and artifacts. More specifically, the information collected at steps 305 and 310 is encoded as nodes, their properties, and edges for the semantic relationships between the nodes. Each subgraph in the GoG is a semantic network corresponding to a distinct assurance requirement.

In some embodiments, the GoG is generated as follows. First, the artifacts are classified based on its relevance to relevance to assurance measurements. For example, as shown in FIG. 1, the final GoG may include subgraphs for mission assurance, memory assurance, thread assurance, and test assurance. Thus, as a threshold classification task, the extracted content item can be classified into one of these subgraph types. More granular classifications may also be performed. For example, in one embodiment, each of the subgraphs discussed above may have their own subgraphs (e.g., the memory assurance subgraph may be partitioned to subgraphs for different types of memory or different types of memory faults that may occur). In general any classification technique known in the art may be used for classifying the content to generate the GoG. For example, in one embodiment, the classification is performed using a neural network trained with assurance-related data.

After the text is classified, the text is correlated to identify relationships between data items. Various techniques generally known in the art may be used to perform correlation. For example, correlation can be viewed as a classification task where the input to the classifier is two content items and the output is a relationship. Using the inputs and outputs, a tuple can be formed that describes the content and its relationship. Various types of classifiers may be employed to perform processing in this manner, including machine learning approaches such as neural networks, linear classifiers, support vector machines, etc. As with the classification task, the classifier used to identify relationships may be trained to specifically identify relationships related to assurance and risk analysis. Once all the tuples have been generated, they may be combined to effectively create the graphs that constitute the GoG.

Once generated, the GoG may be stored in a graph database (GDB) optimized for interaction for underlying data. As is commonly understood in the art, a GDB is a database management system which performs Create, Read, Update and Delete (CRUD) operations on a graph data model. Examples of graph databases that may be utilized include, without limitation, Neo4j, HyperGraphDB, DEX, InfoGrid, Sones, and VertexDB. In some embodiments, rather than storing the entire GoG in a single GDB, the constituent graphs (i.e., the nodes of the GoG) may be stored in separate GDBs linked such that the relationships of the GoG are preserved. In other embodiments, a SQL or no-SQL database that is not graph-based may be used and custom routines (e.g., implemented in MapReduce) may be used to support graph traversal operations. To support portability and human readability of GoG information, the subnetwork of each GoG may be stored using a graph-based file format such as GXL (Graph eXchange Language) or GraphML.

Figure 4:
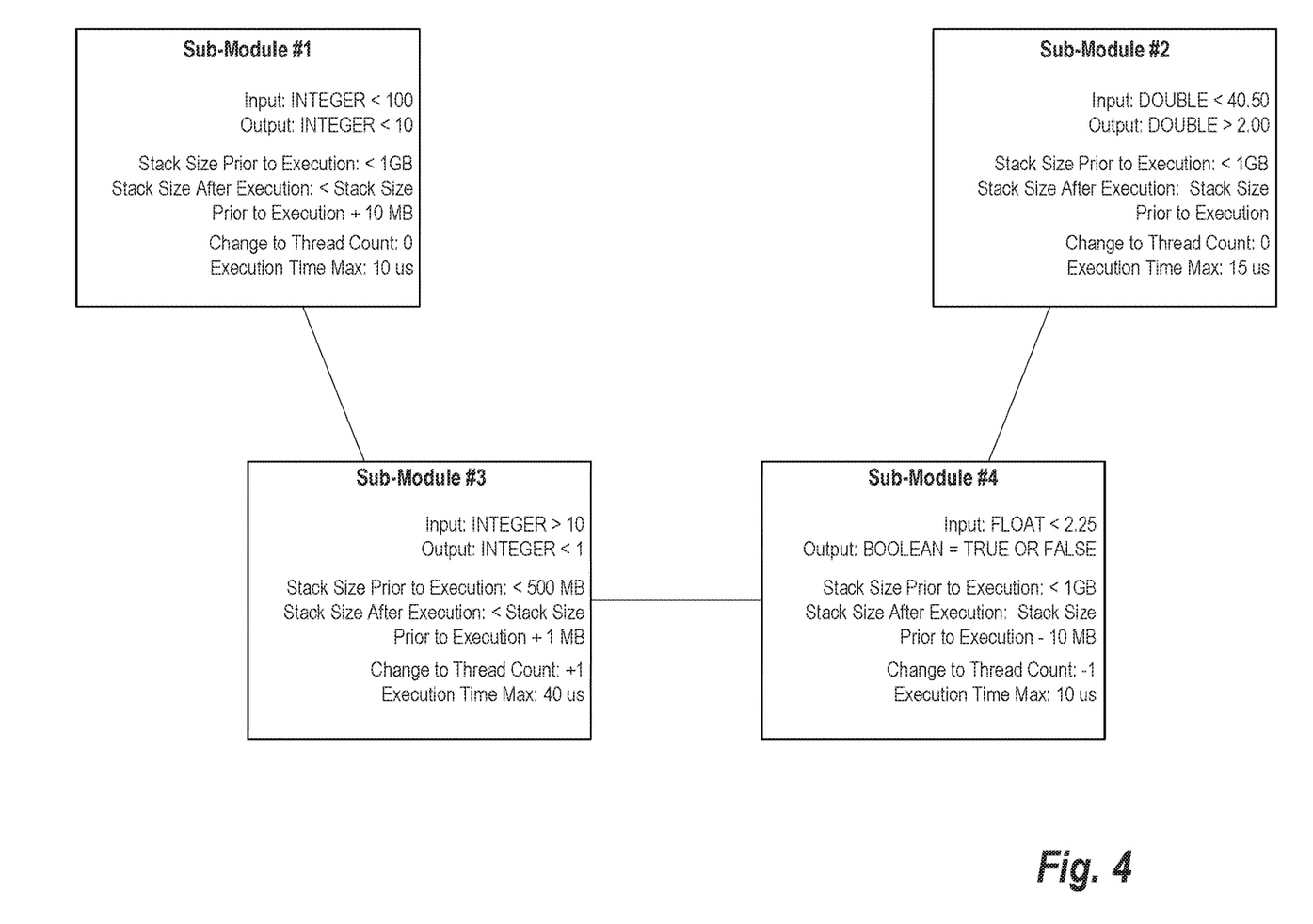
FIG. 4 provides an example of software modules with various assumptions to be met during execution.

The computing system uses the GoG at step 320 to calculate a component assurance value for each software component for each distinct assurance requirement. Various techniques may be used to calculate each component assurance value. For example, FIG. 4 shows examples of guarantees for a group of four sub-modules of a software component. In this example, assumptions are provided for input and output, stack size prior to and after execution, the change to thread count by the sub-module, and the maximum execution time. If an artifact is received that indicates that any assumption is violated, the corresponding sub-module with the violation will be flagged. The degree of assurance in each metric can also be considered. For example, with respect to sub-module 1, the assumption is that execution time will not exceed 10 microseconds. If the execution time is 11 microseconds, this may be flagged as relatively minor risk of failure; conversely if the execution time is much higher (e.g., 30 microseconds), the sub-module can be flagged as having server issues. In this way, assurance of each sub-module may be determined on an assumption-by-assumption basis. These assumptions can then be aggregated to produce an overall assurance measurement for the sub-module. For example, in one embodiment, a summation is performed over all the assumptions individual assurance measurements. This summation may be weighted. For example, certain assumptions like stack size or execution time may be weighted with smaller values rather than the input/output guarantees. These weightings may be provided, for example, by user or default values that may be used based on assumptions known to have severe effects on assurance.

The computing system calculates a system assurance value at step 325 based on the component assurance values.

In some embodiments, the assurance measurement of each sub-module or other component is added together to provide the overall system measurement. Because the interdependencies of the calculated quantities will likely form cyclic structures, in some embodiments, the calculation of assurance algorithm employs a fixpoint computation scheme similar to static data-flow analysis frameworks in order to guarantee the convergence and termination of the computation over cyclic structures.

As shown in FIG. 1, the calculation of the assurance and risk metrics occurs from bottom-up in the assurance graph, where the evidence stemming from the lower-level components is used to compute the metric values for the higher-level components. Likewise, possible causes for assurance issues and elevated risks may be identified and characterized with a degree of belief using evidence theory-based techniques generally known in the art. This provides traceability to the possible root causes of these issues, which can help the user to reduce the effort necessary to pinpoint problem sources and eliminate them. For example, if a particular component is found to exceed a stack size guarantee, that component can be analyzed to determine if the underlying code has a memory leak.

Returning to FIG. 3, at step 330, the computing system presents an architectural view of the software system depicting at least one of the component assurance values and the system assurance values. In one embodiment, the architectural view of the software system comprises a heat map using colors or other visual labels to depict ranges of component assurance values.

After the GoG is updated, it can be updated during the later stages of the software lifecycle. For example, in one embodiment the computer collects new artifacts generated during engineering lifecycle stages of the system software (e.g., verification of the software system, runtime diagnostics, etc.). The GoG is then updated with the new artifacts by creating nodes and connecting them to the other nodes of the GoG. The computer may be notified of the updating (e.g., via an application associated with the database storing the GoG) or, alternatively, the computer may be configured to continuously monitor the GoG for updates. When the computer determines that the GoG has been updated, then computer the recalculates the component assurance value for each software component and, those values may be hierarchically combined to recalculating the overall system assurance value. Additionally, the computer can update the architectural view of the software system based on the recalculation of the component assurance values.

Using the information available in the GoG, the computer may determine the degree of belief and the feasibility of the assurance of every considered aspect for each of the system's components and interconnections, detecting and capturing any possible contract violations, and updating the assurance graph with this derived information. For example, such analysis may be performed on a component-by-component basis. If no assurance issues exist for a component, no additional processing is required and the next component can be analyzed. However, if assurance issues are detected, the computer calculates a degree of confidence for each of the potential causes of assurance issues. These calculated confidence levels are then used to select which of the potential causes of assurance issues is or are likely to be correct. The architectural view of the software system may then be revised to depict the potential causes of assurance issues likely to be correct. For example, for a particular software component the architectural view may present a text label that lists the potential issues. The confidence level in each assurance issue may be expressly provided; or issues could be listed in an order defined by confidence. Alternatively, the architectural view may only list the assurance issue with the highest confidence level.

In some embodiments, the risk of failure or security breach per-component, per-connection, and for the whole system, uses the corresponding computed assurance values. For example, in one embodiment, the GoG is used to calculate a risk of component failure value for each software component by determining that the assurance values exceed a pre-determined threshold value. A risk of system failure value is calculated based on the risk of component failure values. The architectural view of the software system may then depict the risk of component failure values in addition to, or as an alternative to, the risk of system assurance values. For example, in one embodiment, the architectural view comprises a heat map using colors to depict ranges of risk of component failure values.

Figure 5:
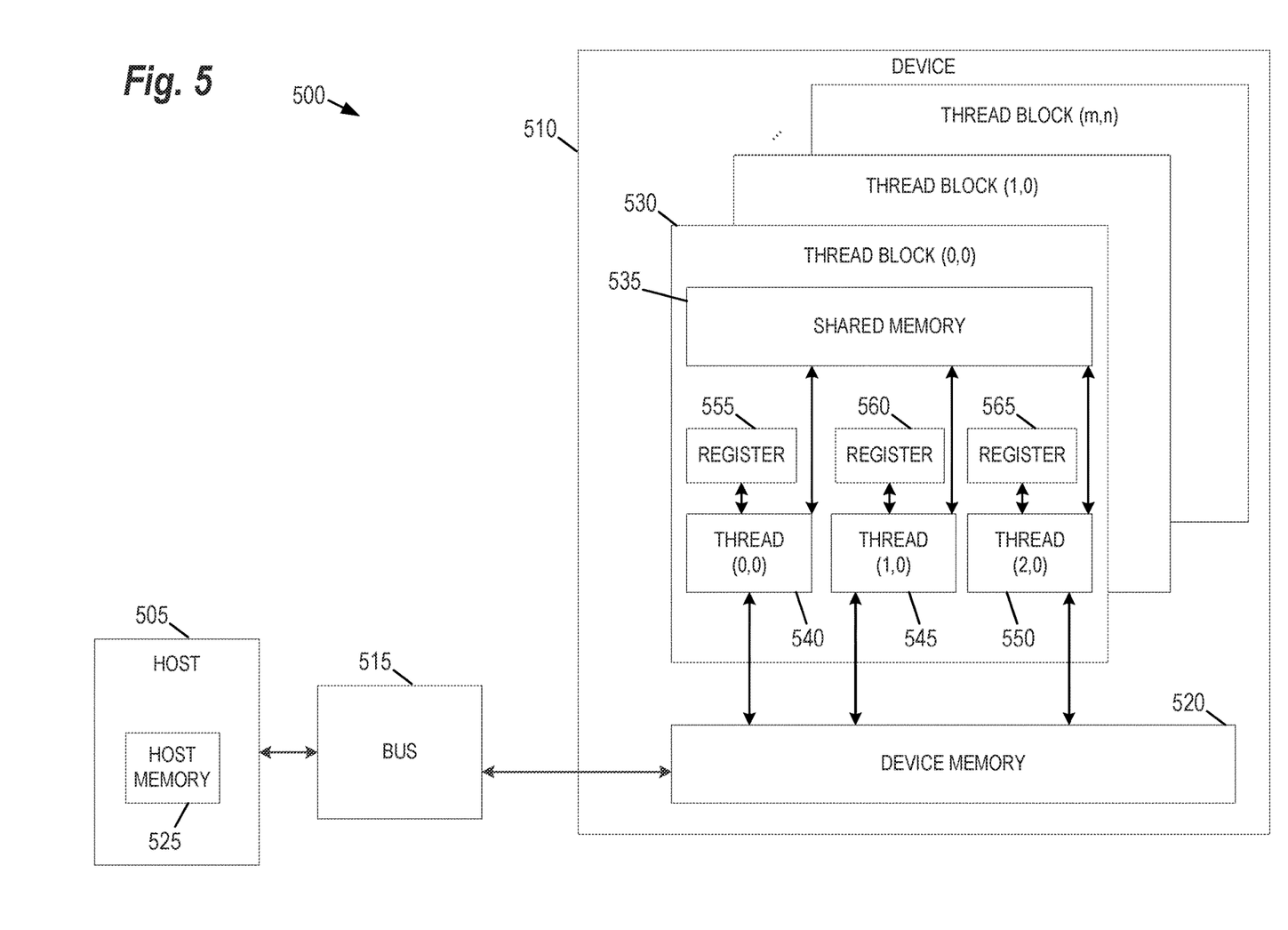
FIG. 5 illustrates an exemplary computing environment within which embodiments of the invention may be implemented

ACE provides a number of benefits over convention assurance and risk analysis systems. For example, as described above, ACE uses a combination of logic-based and data-driven techniques to obtain quantified and supported metrics for assurance and risk for system components with or without formally verifiable models while considering multiple assurance aspects. Additionally, ACE uses a probabilistic framework based on evidence theory to assess the assurance and risk of systems and their components under conditions of uncertainty. This framework introduces a quantitative metric of assurance that is useful in the absence of formal verification results, and which, can expose the varying degree of assurance across the system. ACE also facilitates the automatic tracing of assurance issues to their root causes (generalizing how formal verification can trace specification violations to counterexamples.) Additionally, ACE can benefit stake-holders from the entire system lifecycle by providing system engineers, mission commanders and decision makers with an "assurance heat map" that can guide design and implementation improvement, support the isolation and solution of errors, and assist in strategic decisions FIG. 5 provides an example of a parallel processing memory architecture 500 that may be utilized to perform computations related to execution of the various workflows discussed herein, according to some embodiments of the present invention. This architecture 500 may be used in embodiments of the present invention where NVIDIA™ CUDA (or a similar parallel computing platform) is used. The architecture includes a host computing unit ("host") 505 and a graphics processing unit (GPU) device ("device") 510 connected via a bus 515 (e.g., a PCIe bus). The host 505 includes the central processing unit, or "CPU" (not shown in FIG. 5), and host memory 525 accessible to the CPU. The device 510 includes the graphics processing unit (GPU) and its associated memory 520, referred to herein as device memory. The device memory 520 may include various types of memory, each optimized for different memory usages. For example, in some embodiments, the device memory includes global memory, constant memory, and texture memory.

Parallel portions of a big data platform and/or big simulation platform may be executed on the architecture 500 as "device kernels" or simply "kernels." A kernel comprises parameterized code configured to perform a particular function. The parallel computing platform is configured to execute these kernels in an optimal manner across the architecture 500 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the architecture 500 of FIG. 5 (or similar architectures) may be used to parallelize modification or analysis of the GoG. For example, in some embodiments, the operations of the big data platform may be partitioned such that multiple kernels analyze different sub-graphs simultaneously.

The device 510 includes one or more thread blocks 530 which represent the computation unit of the device 510. The term thread block refers to a group of threads that can cooperate via shared memory and synchronize their execution to coordinate memory accesses. For example, in FIG. 5, threads 540, 545 and 550 operate in thread block 530 and access shared memory 535. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 5, the thread blocks 530 are organized in a two dimensional grid structure with m+1 rows and n+1 columns Generally, threads in different thread blocks of the same grid cannot communicate or synchronize with each other. However, thread blocks in the same grid can run on the same multiprocessor within the GPU at the same time. The number of threads in each thread block may be limited by hardware or software constraints.

Continuing with reference to FIG. 5, registers 555, 560, and 565 represent the fast memory available to thread block 530. Each register is only accessible by a single thread. Thus, for example, register 555 may only be accessed by thread 540. Conversely, shared memory is allocated per thread block, so all threads in the block have access to the same shared memory. Thus, shared memory 535 is designed to be accessed, in parallel, by each thread 540, 545, and 550 in thread block 530. Threads can access data in shared memory 535 loaded from device memory 520 by other threads within the same thread block (e.g., thread block 530). The device memory 520 is accessed by all blocks of the grid and may be implemented using, for example, Dynamic Random-Access Memory (DRAM).

Each thread can have one or more levels of memory access. For example, in the architecture 500 of FIG. 5, each thread may have three levels of memory access. First, each thread 540, 545, 550, can read and write to its corresponding registers 555, 560, and 565. Registers provide the fastest memory access to threads because there are no synchronization issues and the register is generally located close to a multiprocessor executing the thread. Second, each thread 540, 545, 550 in thread block 530, may read and write data to the shared memory 535 corresponding to that block 530. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 510 to read and/or write to the device memory. Device memory requires the longest time to access because access must be synchronized across the thread blocks operating on the device. Thus, in some embodiments, the processing of each sub-graph is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 5, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only.

Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

We claim:

1. A computer-implemented method for quantifying assurance of a software system comprising plurality of software components, the method comprising:
    running the software system so as to define a runtime operation phase;
    monitoring the runtime operation phase so as to collect runtime data;
    collecting one or more artifacts of the software system generated during one or more phases of the software system's engineering lifecycle, wherein at least one of the one or more artifacts comprises the runtime data collected during the runtime operation phase of the software system's engineering lifecycle;
    constructing a graph of graphs (GoG) encoding the artifacts so as to define respective subgraphs, wherein each subgraph in the GoG is a semantic network corresponding to a distinct assurance requirement;
    using the GoG to calculate a component assurance value for each software component for each distinct assurance requirement;
    calculating a system assurance value based on the component assurance values; and
    presenting an architectural view of the software system depicting at least one of the component assurance values and the system assurance values, so as to identify, based on the subgraphs, at least one risk hotspot associated with the software system.

2. The method of claim 1, wherein the architectural view of the software system comprises a heat map using colors to depict ranges of component assurance values.

3. The method of claim 1, further comprising:
    for each component,
        using the GoG to identify a plurality of potential causes of assurance issues associated with the component;
        calculating a degree of confidence for each of the plurality of potential causes of assurance issues; and
        using the calculated confidence levels to select which of the potential causes of assurance issues is or are likely to be correct,
    wherein the architectural view of the software system depicts the potential causes of assurance issues likely to be correct.

4. The method of claim 1, further comprising:
    using the GoG to calculate a risk of component failure value for each software component; and
    calculating a risk of system failure value based on the risk of component failure values based on at least one of the component assurance values and the system assurance values,
    wherein the architectural view of the software system depicts at least one of the risks of component failure values and the risk of system assurance values.

5. The method of claim 4, wherein the architectural view of the software system comprises a heat map using colors to depict ranges of risk of component failure values.

6. The method of claim 4, further comprising:
    for each component,
        using the GoG to identify a plurality of potential causes of component failure associated with the component;
        calculating a degree of confidence for each of the potential causes of component failure issues;
        using the calculated confidence levels to select which of the potential causes of component failure is or are likely to be correct;
    wherein the architectural view of the software system depicts the potential causes of component failure likely to be correct.

7. The method of claim 1, further comprising:
    collecting one or more new artifacts generated during engineering lifecycle stages of the system software;
    updating the graph of graphs (GoG) with the new artifacts;
    recalculating the component assurance value for each software component;
    recalculating system assurance value based on the component assurance values; and
    updating the architectural view of the software system based on the recalculation of the component assurance values.

8. The method of claim 7, wherein the new artifacts are collected during verification of the software system.

9. The method of claim 7, wherein the new artifacts comprise runtime diagnostics data associated with the software system.

10. A system for quantifying assurance of a software system comprising plurality of software components, the system comprising:
    a database storing a graph of graphs (GoG) encoding (a) a list of contracts associated with the software system providing assumptions and guarantees for execution of each software component and (b) one or more artifacts of the software system generated during one or more phases of the software system's engineering lifecycle,
    a computer configured to:
        run the software system so as to define a runtime operation phase;
        monitor the runtime operation phase so as to collect runtime data, wherein at least one of the one or more artifacts comprises the runtime data collected during the runtime operation phase of the software system's engineering lifecycle;
        use the GoG to calculate a component assurance value for each software component for each distinct assurance requirement;
        calculate a system assurance value based on the component assurance values; and
        present an architectural view of the software system depicting at least one of the component assurance values and the system assurance values, so as to identify, based on the GoG, at least one risk hotspot associated with the software system.

11. The system of claim 10, wherein each subgraph in the GoG is a semantic network corresponding to a distinct assurance requirement.

12. The system of claim 10, wherein the architectural view of the software system comprises a heat map using colors to depict ranges of component assurance values.

13. The system of claim 10, wherein the architectural view of the software system depicts the potential causes of assurance issues likely to be correct.

14. The system of claim 10, wherein the architectural view of the software system depicts at least one of a risk of component failure values derived from at least one of the component assurance values and the system assurance values.

15. The system of claim 14, wherein the architectural view of the software system comprises a heat map using colors to depict ranges of the risk of component failure values.

16. The system of claim 14, wherein the architectural view of the software system depicts potential causes of component failure likely to be correct derived using evidence theory.

17. The system of claim 10, wherein the computer is further configured to:
   collect one or more new artifacts generated during engineering lifecycle stages of the system software;
   update the graph of graphs (GoG) with the new artifacts;
   recalculate the component assurance value for each software component;
   recalculate system assurance value based on the component assurance values; and
   update the architectural view of the software system based on the recalculation of the component assurance values.

18. The system of claim 17, wherein the computer collects new artifacts during verification of the software system.

19. The system of claim 17, wherein the new artifacts comprise runtime diagnostics data associated with the software system.

20. An article of manufacture for quantifying assurance of a software system comprising plurality of software components, the article of manufacture comprising a non-transitory, tangible computer-readable medium holding computer-executable instructions for performing a method comprising:
   running the software system so as to define a runtime operation phase;
   monitoring the runtime operation phase so as to collect runtime data;
   collecting one or more artifacts of the software system generated during one or more phases of the software system's engineering lifecycle, wherein at least one of the one or more artifacts comprises the runtime data collected during the runtime operation phase of the software system's engineering lifecycle;
   constructing a graph of graphs (GoG) encoding the artifacts so as to define respective subgraphs, wherein each subgraph in the GoG is a semantic network corresponding to a distinct assurance requirement;
   using the GoG to calculate a component assurance value for each software component for each distinct assurance requirement;
   calculating a system assurance value based on the component assurance values; and
   presenting an architectural view of the software system depicting at least one of the component assurance values and the system assurance values, so as to identify, based on the subgraphs, at least one risk hotspot associated with the software system.

* * * * *